(12) United States Patent
Yamaguchi et al.

(10) Patent No.: US 9,318,242 B2
(45) Date of Patent: Apr. 19, 2016

(54) SUPERCONDUCTING POWER TRANSMISSION SYSTEM

(75) Inventors: Sataro Yamaguchi, Aichi (JP); Hirofumi Watanabe, Aichi (JP)

(73) Assignee: CHUBU UNIVERSITY EDUCATIONAL FOUNDATION, Aichi (JP)

( * ) Notice: Subject to any disclaimer, the term of this patent is extended or adjusted under 35 U.S.C. 154(b) by 341 days.

(21) Appl. No.: 13/821,277

(22) PCT Filed: Sep. 5, 2011

(86) PCT No.: PCT/JP2011/070663
§ 371 (c)(1),
(2), (4) Date: May 24, 2013

(87) PCT Pub. No.: WO2012/033208
PCT Pub. Date: Mar. 15, 2012

(65) Prior Publication Data
US 2013/0240236 A1    Sep. 19, 2013

(30) Foreign Application Priority Data
Sep. 7, 2010    (JP) ................ 2010-200333

(51) Int. Cl.
| H01B 12/00 | (2006.01) |
| F25J 1/00 | (2006.01) |
| H02G 15/34 | (2006.01) |
| H01F 6/06 | (2006.01) |

(52) U.S. Cl.
CPC ............. *H01B 12/00* (2013.01); *F25J 1/0022* (2013.01); *H02G 15/34* (2013.01); *Y02E 40/648* (2013.01)

(58) Field of Classification Search
USPC .................................... 174/125.1
See application file for complete search history.

(56) References Cited

U.S. PATENT DOCUMENTS

| 3,664,147 A * | 5/1972 | Blackmon .................. 62/85 |
| 6,873,397 B2 * | 3/2005 | Yabu ........................ 355/30 |
| 7,692,338 B2 * | 4/2010 | Yamaguchi ................ 307/147 |
| 7,701,225 B2 * | 4/2010 | Hirose et al. ............. 324/544 |

(Continued)

FOREIGN PATENT DOCUMENTS

| CN | 101072969 A | 11/2007 |
| JP | 48-40072 A | 9/1946 |

(Continued)

OTHER PUBLICATIONS

International Preliminary Report on Patentability issued on Apr. 18, 2013 in International Patent Application No. PCT/JP2011/070663.

(Continued)

*Primary Examiner* — Timothy Thompson
*Assistant Examiner* — Michael F McAllister
(74) *Attorney, Agent, or Firm* — Sughrue Mion, PLLC (57) ABSTRACT

In a thermally insulated double pipe, a structure is provided in which an inner pipe may be prevented from being appreciably offset relative to an outer pipe due to thermal contraction. The structure includes an inner pipe 101, within which a superconducting cable is mounted, an outer pipe 103 within which the inner pipe is housed, with the inner and outer pipes constituting a thermally insulated double pipe, and an inner pipe support member 104 supporting the inner pipe. The inner pipe support member 104 is secured to the inner and outer pipes.

12 Claims, 7 Drawing Sheets

(56) References Cited

U.S. PATENT DOCUMENTS

| | | | |
|---|---|---|---|
| 8,280,467 B2 * | 10/2012 | Yuan et al. | 505/163 |
| 2005/0252571 A1 * | 11/2005 | Nakano et al. | 141/66 |
| 2006/0211579 A1 * | 9/2006 | Yamaguchi | 505/230 |
| 2007/0084623 A1 * | 4/2007 | Yamaguchi | 174/125.1 |
| 2009/0197769 A1 * | 8/2009 | Hirose | 505/163 |

FOREIGN PATENT DOCUMENTS

| | | |
|---|---|---|
| JP | 2003-89512 A | 3/2003 |
| JP | 2006-032186 A | 2/2006 |
| JP | 2006-179355 A | 7/2006 |
| JP | 2006-210263 A | 8/2006 |
| JP | 2008-239303 A | 10/2008 |
| JP | 2010-165552 A | 7/2010 |
| WO | 2006137858 A2 | 12/2006 |

OTHER PUBLICATIONS

Communication dated Apr. 14, 2015 from the Japanese Patent Office in counterpart application No. 2010-200333.

Communication dated Dec. 26, 2014, issued by the State Intellectual Property Office of the People's Republic of China in counterpart Application No. 201180053330.1.

* cited by examiner

SUPERCONDUCTING POWER TRANSMISSION SYSTEM

FIELD

This application claims the benefit of the priority of Japanese Patent Application No. 2010-200333 filed on Sep. 7, 2010, the entire disclosure thereof being incorporated herein by reference thereto.

This invention relates to a superconducting electrical power transmission system.

BACKGROUND

In a power transmission system, employing a superconducting cable, such configuration that assures a facilitated laying-down operation and that operates as measures against heat intrusion has been proposed in Patent Literatures 1 and 2, as examples, by Satarou Yamaguchi, one of the present inventors.

Patent Literature 1 shows a configuration including a first pipe, within which a superconducting cable is housed, and a second pipe of a ferromagnetic material, disposed on an outer side of the first pipe. In the disclosed configuration, an end part(s) of a straight-shaped pipe section of the superconducting cable is connected by a bellows pipe, and the first pipe includes the bellows pipe.

Figure 6:
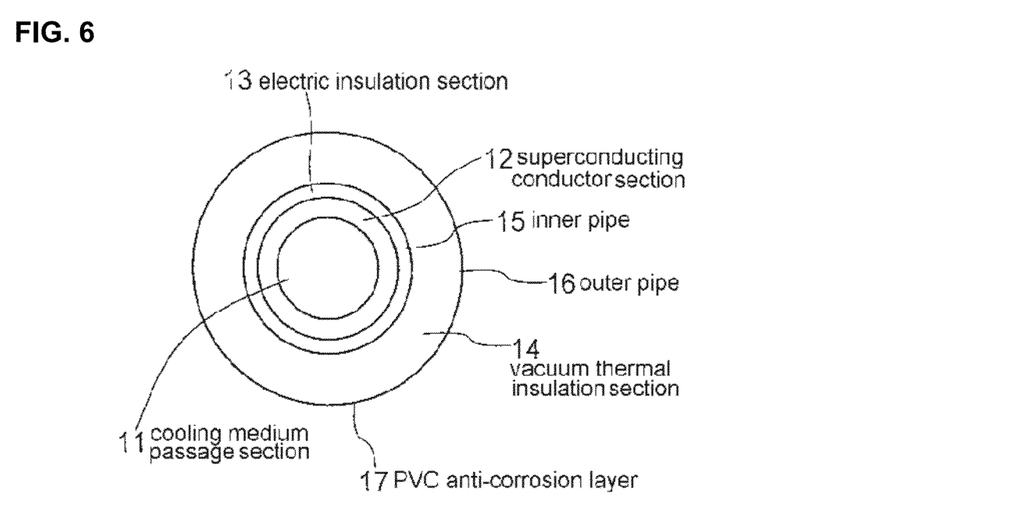
FIG. 6 is a schematic view showing the configuration of a thermally insulated double pipe.

Patent Literature 2 shows a superconducting power transmission cable at least including a first pipe, within which a superconducting conductor part is disposed, and a second pipe arranged on the outer side of the first pipe. A vacuum thermally insulating section is provided between the first and second pipes. A first pipe support ring that bears against an outer wall section of the first pipe is also provided between the first and second pipes, and a second pipe support ring is fitted on the inner wall section side of the second pipe. A support member is arranged between the first and second pipe support rings. FIG. 6 shows a configuration of a thermally insulated double-shell pipe. A cooling medium passage section 11, a superconducting conductor section 12 and an electrical insulation section 13 are provided in the superconducting conductor part which is housed within the first pipe 15 (see FIG. 6). The term "double-shell pipe" is termed herein as "double pipe".

CITATION LIST

[Patent Literature]
[Patent Literature 1] JP Patent Kokai JP-A-2006-210263
[Patent Literature 2] JP Patent Kokai JP-A-2006-32186

SUMMARY

The present inventors conducted eager searches, and arrived at the present invention which is proposed herewith.

In one aspect of the present invention, there is provided a superconducting power transmission system. The system includes a thermally insulated double pipe composed by an inner pipe within which a superconducting cable is installed and by an outer pipe within which the inner pipe is housed, and an inner pipe support member(s) supporting the inner pipe. The inner pipe support member(s) is secured to the inner and outer pipes.

According to the present invention, the superconducting power transmission system further includes a bellows pipe housed within the outer pipe. The bellows pipe is connected to an end(s) of the inner pipe. The superconducting cable is housed within the inside of the bellows pipe.

In another aspect of the present invention, there is provided a superconducting power transmission system further including an object to be imaged by a camera, with the object being connected to an end part of the superconducting cable within a cryostat. The camera is installed at a site thermally insulated from the cryostat and is configured for imaging the object within the cryostat through a window. A control device analyzes picture image data of the object acquired by the camera to detect an object's displacement. On detection of the displacement by the control device, a driving device causes movement of the cryostat in its entirety.

According to the present invention, the superconducting power transmission system further includes an illumination device that illuminates the object.

According to the present invention, the object is arranged at an end part of a straight-shaped connection member, which straight-shaped connection member is connected to a support section at an end part of the superconducting cable and is further extended along a length of the cable.

In another aspect of the present invention, both ends of the superconducting cable are provided with free supported terminal ends movable along the length of the cable.

In another aspect of the present invention, the superconducting cable is fixedly supported by the inner pipe at a mid part between both ends of the superconducting cable.

In another aspect of the present invention, there is provided a superconducting power transmission system, wherein a pre-set sort of gas is introduced into a vacuum region between the inner and outer pipes of the thermally insulated double pipe to effect gas replacement to perform evacuation to vacuum.

According to the present invention, the inner pipe is cooled following the evacuation to vacuum.

According to the present invention, the preset sort of gas is inclusive of a carbon oxide gas. The pre-set sort of gas is such a gas that solidifies at a temperature higher than the liquid nitrogen temperature, with a saturated vapor pressure at such time being low, that is gaseous at ambient temperature and ambient pressure, that is relatively low in viscosity and in dipolar moment, and that has a relatively high mass number.

According to the present invention, the pre-set sort of gas is a carbon oxide gas, a rare gas including argon and xenon, to the exclusion of neon, a chlorofluorocarbon (CFC) gas matched to the above conditions, a hydrocarbon-based gas, or a mixture(s) thereof.

In another aspect of the present invention, the superconducting cable includes a plurality of superconducting wire tape materials, the outer pipe includes a first feed-through, and the inner pipe includes a second feed-through [facing the first feed-through]. There are provided one or a plurality of first leads electrically insulated one from another. One end(s) of the first lead(s) are connected to a vacuum side electrode of the first feed-through and the other end(s) of the first lead(s) are connected to one side of the facing second feed-through. There are also provided a plurality of second leads electrically insulated one from another. Each of the second leads has one end connected to each first lead on the opposite side of the second feed-through, while having the other opposite end connected to one end of each of the plurality of the superconducting wire tape materials. A connection portion between the plurality of the second leads and the plurality of the superconducting wire tape materials is formed of a retention structure.

In yet another aspect of the present invention, there is provided a method for evacuation to vacuum for a thermally insulated double pipe, in which the method comprises: introducing a pre-set sort of gas into a vacuum region defined between an inner pipe and an outer pipe composing a thermally insulated double pipe, such as to effect gas replacement, evacuating to vacuum, and subsequently cooling the inner pipe. A superconducting cable is installed within the inner pipe, and the inner pipe is housed within the outer pipe.

According to the present invention, there is no risk that the inner pipe becomes appreciably displaced (or offset) on thermal contraction from the outer pipe, or that a multi-layered radiation shield film which covers up the inner pipe becomes injured.

Moreover, according to the present invention, in which an object attached to the end part of the superconducting cable is monitored on a picture image, contraction or expansion of the superconducting cable may be monitored. The driving device causes movement of the cryostat in its entirety in response to such contraction or expansion of the superconducting cable. It is thus possible to alleviate thermal stress that might be generated in the superconducting cable due to its contraction or expansion caused by changes in temperature.

According to the present invention, both ends of the superconducting cable are displaceable along the longitudinal direction, owing to the free supported terminal ends, thereby alleviating any thermal stress that might be generated with the contraction or expansion of the superconducting cable.

Moreover, according to the present invention, the pre-set sort of gas is introduced in the vacuum region of the thermally insulated double pipe by way of gas replacement. Evacuation to vacuum and cooling are then carried out in this order to achieve a high degree of vacuum.

PREFERRED MODES

In the description to follow, proposed are:
1) supporting an inner pipe of a thermally insulated double pipe of the superconducting transmission system;
2) a picture image processing device responsive to cable contraction and a movable rack;
3) securing the superconducting cable;
4) evacuation to vacuum for the thermally insulated double pipe, and
5) rendering uniform the current through the superconducting wire tape materials.

<Supporting an Inner Pipe of a Thermally Insulated Double Pipe>

Figure 1:
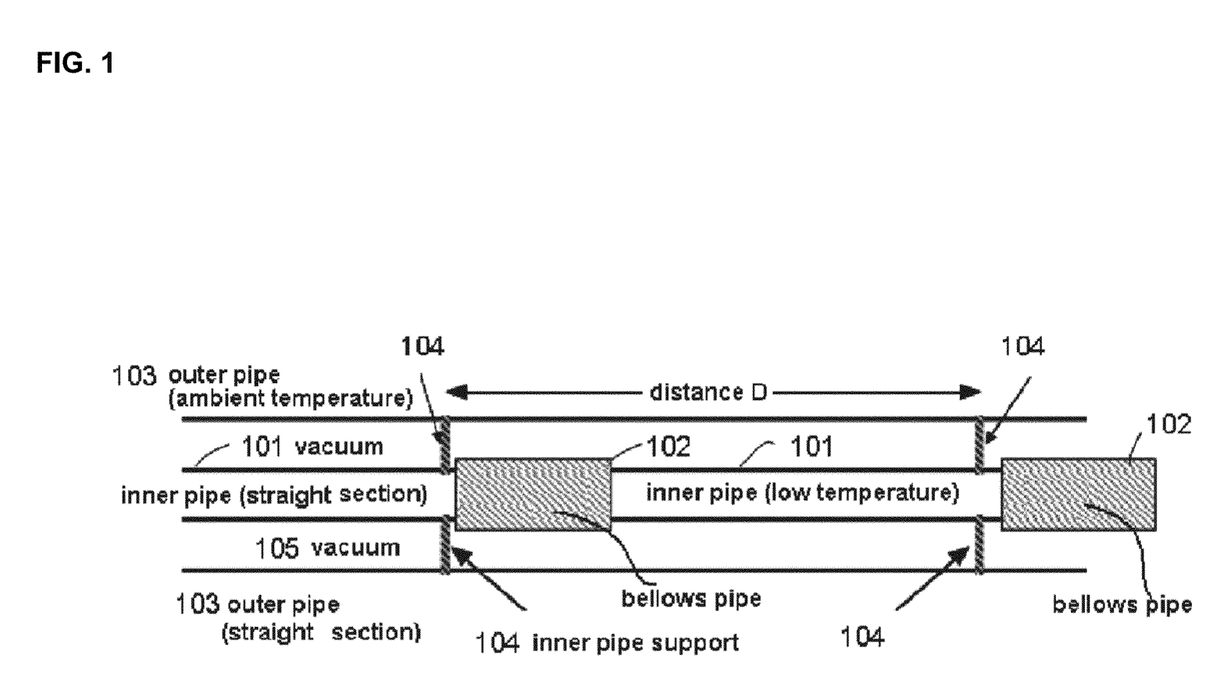
FIG. 1 is a schematic view showing an illustrative exemplary embodiment 1 of the present invention.
Figure 7:
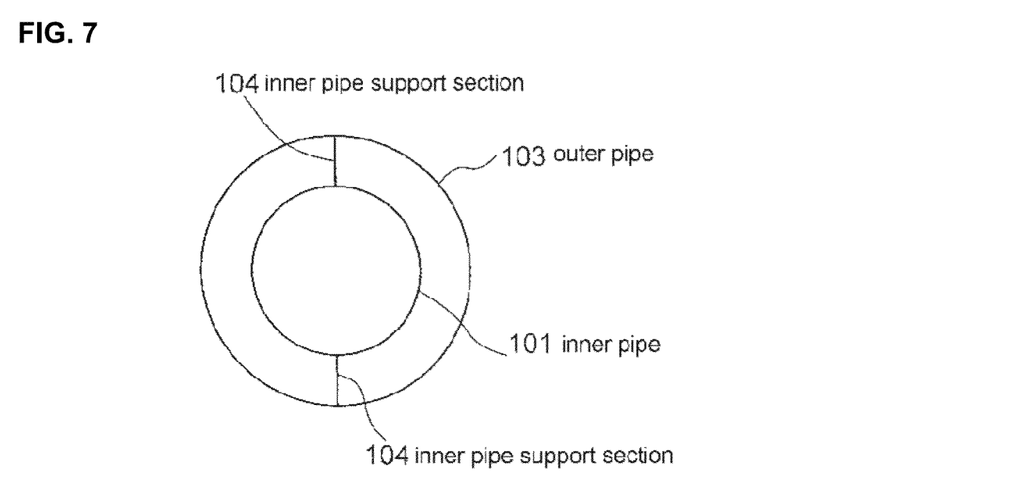
FIG. 7 is a schematic view showing a cross-sectional configuration of the exemplary embodiment 1 of the present invention shown in FIG. 1.

FIG. 1 depicts a diagrammatic view showing an illustrative configuration of an exemplary embodiment 1 according to the present invention, and shows a configuration designed for supporting an inner pipe of a thermally insulated double pipe. FIG. 7 depicts a schematic view showing a cross-sectional configuration of the exemplary embodiment 1 of the present invention shown in FIG. 1. The inner pipe is composed by a straight-shaped inner pipe section 101 and by a bellows pipe 102 connecting to an end of the straight-shaped inner pipe section 101. An outer pipe 103 is a straight-shaped pipe. A multi-layered radiation shielding film, not shown, composed by a plurality of sheets, coated with aluminum, as an example, is provided in a vacuum thermally insulating section 105 defined between the inner and outer pipes. A superconducting cable, formed of an equi-high-temperature superconductor material, such as an oxide material, may be disposed on an inner side of the inner pipe, via an electric insulation section, so that a cooling medium at a liquid nitrogen temperature may be passed through the inner side of the cable.

An inner pipe support section 104, supporting the inner pipe from the outer pipe 103, is secured to the outer pipe 103 and to the straight-shaped inner pipe section 101.

The outer pipe 103 is not subjected to thermal contraction, so that there is no change in a distance D before and after cooling. However, the straight-shaped inner pipe section 101 is thermally contracted after cooling due to the low temperature. This thermal contraction is absorbed (taken up) by extension of the bellows pipe 102.

Where a power transmission pipe is bent, a bent pipe may be used in place of a straight-shaped pipe, or a bellows or corrugated pipe may sometimes be used. In this case, the inner pipe support section 104 is also secured to both the outer pipe 103 and the [straight-shaped] inner pipe [section] 101. It is noted that, in FIG. 7, two of the inner pipe support sections 104, each being a member extending radially between an outer wall section of the [straight-shaped] inner pipe [section] 101 and an inner wall section of the outer pipe 103, are disposed at diametrically opposite positions of the inner pipe, that is, at an angular spacing of 180° from each other. Alternatively, three or four of the inner pipe support sections 104 may be provided at angular spacing of 120° or 90°, respectively.

In the thermally insulated double pipe, the outer pipe 103 is at an ambient temperature. However, the inner pipe is cooled down to the liquid nitrogen temperature, and hence is subjected to thermal contraction. The bellows pipe or the corrugated pipe is welded to the end of the straight-shaped pipe section of the straight-shaped inner pipe section 101. Owing to the inner pipe support section 104, the inner pipe is not offset (displaced) appreciably by thermal contraction with respect to the outer pipe 103, such that there is no risk of injuries to the multi-layered radiation shielding film, not shown, applied to the straight-shaped inner pipe section 101.

<Picture Image Processing Device Responsive to Cable Contraction and Movable Rack>

Figure 2:
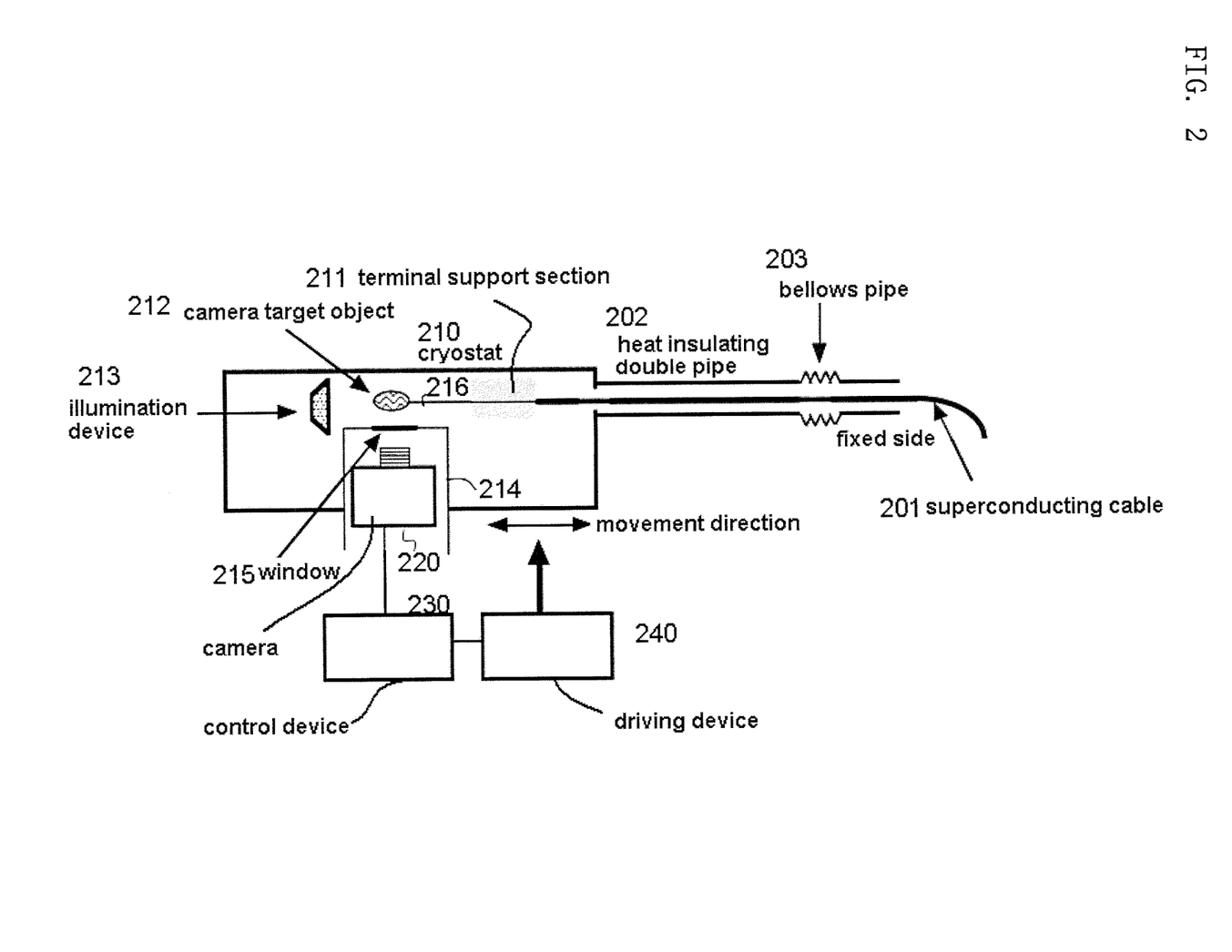
FIG. 2 is a schematic view showing an illustrative exemplary embodiment 2 of the present invention.

FIG. 2 depicts a schematic view showing a configuration of an illustrative exemplary embodiment 2 of the present invention. A camera 220 images a camera target object 212 which is arranged in a cryostat 210 (thermally insulated vacuum vessel) and moved (displaced) with contraction/expansion of a superconducting cable 201. The image information as imaged (digital image information) is sent to a control device 230 in order to monitor the position of the camera target object 212. The camera target object 212 is connected to an end part of a straight-shaped connection member 216 which is connected to a terminal support section 211 at a terminal end of the superconducting cable and which is aerially extended along the longitudinal direction of the superconducting cable. When the camera target object 212 is displaced, a picture image processing software, executed by a CPU, not shown, within the control device 230, recognizes such displacement of the camera target object 212 and instructs a driving device 240 to perform a movement, indicating the direction as well as the distance of the movement. The driving device 240 accordingly causes the movement of the cryostat 210 in its pre-set movement direction under instructions from the control device 230. If the superconducting cable 201 is contracted such that the camera target object 212 is displaced towards right in FIG. 2, the driving device 240 causes movement of the cryostat 210 as a whole, inclusive of the camera 220, towards right in the drawing. If the superconducting cable 201 is expanded such that the camera target object 212 is displaced towards left in FIG. 2, the driving device 240 causes movement of the cryostat 210 as a whole, inclusive of the camera 220, towards left in the drawing. This prevents any thermal stress, attendant on the contraction or expansion due to changes in temperature of the superconducting cable 201, from being generated in the superconducting cable 201. Since the cryostat 210 is cooled down to, for example, the liquid nitrogen temperature, and since the camera 220 does not operate at lower temperatures, the camera is mounted on an ambient temperature side via a thermal insulation member (partition chamber) 214 from the superconducting cable 201, and images the camera target object 212 through a window 215 provided in the thermal insulation member 214. The cryostat 210 includes an illumination device 213, such as an LED, for illuminating the camera target object 212. It should be noted that the illumination device 213, such as an LED, may be provided in the thermal insulation member (partition chamber) 214 to illuminate along the imaging direction of the camera 220.

Although the outer pipe of the thermally insulated double pipe is at ambient temperature, its inner pipe is cooled down to the liquid nitrogen temperature, and hence is subjected to thermal contraction. For this reason, the inner pipe is composed by a straight-shaped pipe welded to a bellows pipe or a corrugated pipe designed to absorb the thermal contraction. Among the devices subjected to thermal contraction, other than the inner pipe of the thermally insulated double pipe, there is a superconducting cable.

To absorb the thermal contraction of the inner pipe, the bellows pipe 102 may be used, as described above in connection with the exemplary embodiment 1. However, a bellows pipe, such as 203, for example, may not be used to cope with thermal contraction of the superconducting cable 201. Hence, there is no alternative but to absorb the contraction thereof at (or by) the terminal section of the superconducting cable 201.

For this reason, the cryostat 210, in which the terminal part of the superconducting cable 201 is housed, is movable along the longitudinal direction of the superconducting cable 201 in order to absorb the thermal contraction or expansion of the superconducting cable 201.

In FIG. 2, the bellows pipe 203 is connected also to the outer pipe of the thermally insulated double pipe, and a distal end portion of the bellows pipe is fixed. However, the terminal end side of the superconducting cable 201 as a whole is movable. The thermal contraction as well as expansion of the superconducting cable 201 can automatically be dealt with by exploiting the control device 230 (picture image processing device). The terminal end part of the superconducting cable 201 is housed within the cryostat 210 and connections are made as necessary. The camera target object 212, observed by the camera, is connected to an end part of the superconducting cable 201 via a terminal support section 211. The camera target object 212 is displaced to follow the thermal contraction or expansion of the superconducting cable 201. The camera 220 observes this displacement, that is, observes that the camera target object 212 is displaced to follow thermal contraction or expansion of the superconducting cable 201. The camera 220 observes this, viz., it observes that the superconducting cable is contracted and expanded during temperature lowering time and temperature rising time, respectively. The control device 230 performs picture image processing and causes movement of the cryostat 210 via the driving device 240 so that no thermal stress will be generated in the superconducting cable 201.

<Securing the Superconducting Cable 201>

Figure 3:
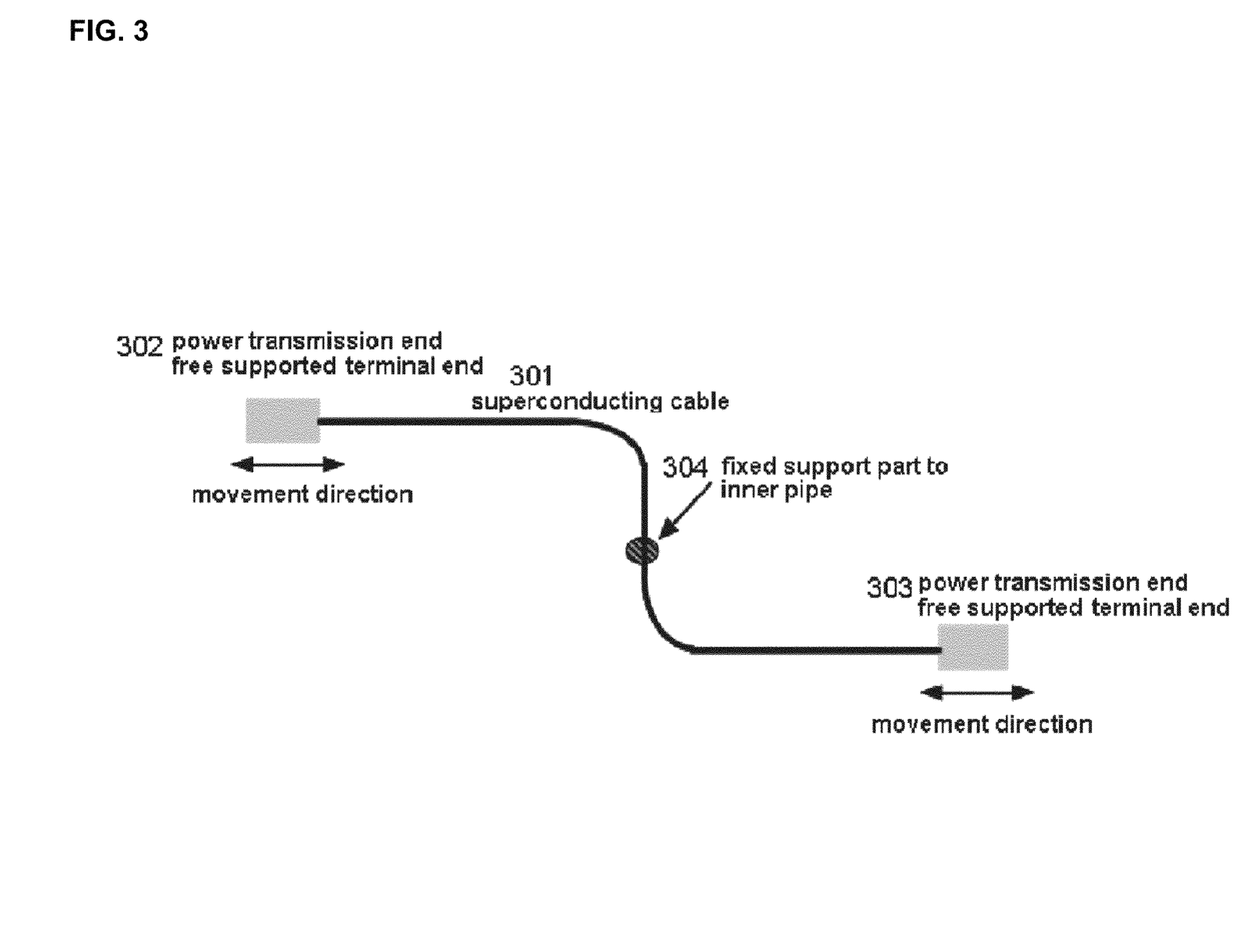
FIG. 3 is a schematic view showing an illustrative exemplary embodiment 3 of the present invention.

FIG. 3 depicts a schematic view showing an illustrative configuration of an exemplary embodiment 3 according to the present invention. A superconducting cable 301 has its mid portion along the cable length affixed to the inner pipe (101 of FIG. 1). The superconducting cable 301 is installed in the inner pipe (inner pipe 1 and in bellows pipe 102 of FIG. 1) of the thermally insulated double pipe (202 of FIG. 2), as shown in FIG. 1.

The superconducting cable 301 is repeatedly subjected to thermal contraction and expansion during cooling (low temperature) and during temperature rise (ambient temperature). To prevent thermal stress from being generated in the superconducting cable 301, the superconducting cable 301 has its both ends formed as free supported terminal ends 302, 303 so that it is movable in the longitudinal direction. In case both ends of the superconducting cable 301 are movable, in this manner, the superconducting cable in its entirety may be moved, by way of an inchworm-like movement, in one or the opposite direction. Hence, the superconducting cable 301 is secured to the inner pipe at a mid portion along the length of the superconducting cable 301, as indicated by a fixed support part to the inner pipe shown for example in FIG. 3.

<Evacuation to Vacuum for Thermally Insulated Double Pipe>

Figure 4:
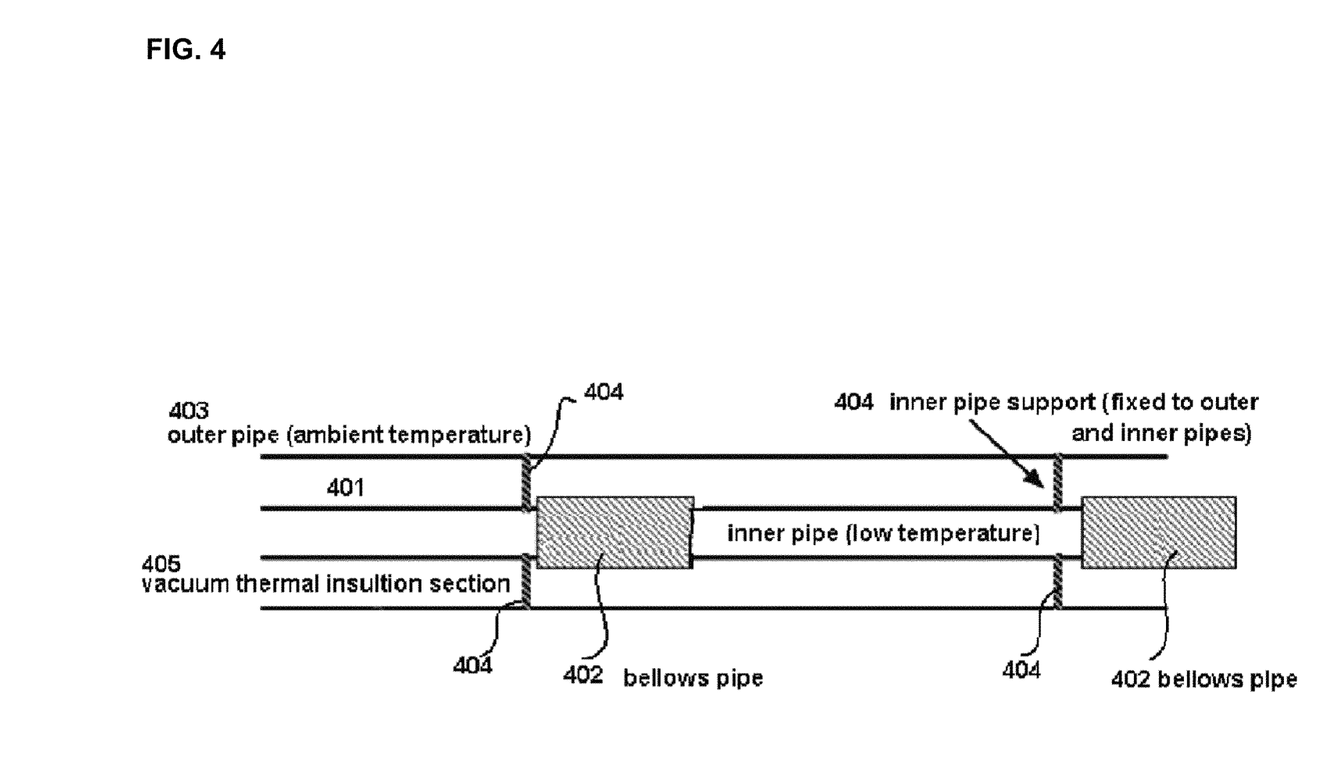
FIG. 4 is a schematic view showing an illustrative exemplary embodiment 4 of the present invention.

FIG. 4 depicts a schematic view showing a configuration of an illustrative exemplary embodiment 4 of the present invention. A carbon oxide gas is introduced into a vacuum thermally insulating section 405 of the thermally insulated double pipe, which is a spacing outside the inner pipe and inside the outer pipe, by way of performing gas replacement with a carbon oxide gas. By carrying out such gas replacement twice, thrice or so, the vacuum thermally insulating section 405 is substantially charged with carbon oxide gas. The vacuum thermally insulating section is then cooled. Since carbon oxide gas solidifies at the liquid nitrogen temperature, a high degree of vacuum is established.

Such a gas that solidifies at a temperature higher than the liquid nitrogen temperature, with a saturated vapor pressure at such time being low, that is gaseous at ambient temperature and ambient pressure, that is relatively low in viscosity and in dipolar moment and that has a relatively high mass number, is suited for use as this sort of gas for replacement. Thus, the following gases:

a) rare gases, such as argon or xenon, to the exclusion of neon;
b) chlorofluorocarbon CFC (Freon) gases, providing that, in view of there being many sorts of the gases, such a gas that matches to the above conditions should be selected;
c) hydrocarbon based gases, such as ethane, propane or butane; and
d) a mixture(s) of the above gases are suited as a gas(es) for gas replacement in addition to the carbon oxide gas.

In view of longer length of the thermally insulated double pipe, evacuation to vacuum for the thermally insulated double pipe is an extremely time-consuming operation. As an example, in a 500 m cable project of NEDO, it took one month in evacuating to vacuum. If this distance is increased in future to several to several tens of kms, it would be necessary to finish evacuating to vacuum in a shorter time. Additionally, to improve the vacuum thermal insulation performance, a high degree of vacuum must be set. It is noted that a technique known as 'baking' is used for such case. In this technique, a vacuum vessel is heated from outside to maintain a temperature of 100° C. or more for several hours, during which time evacuation to vacuum is carried out by a vacuum pump. However, it is technically almost impossible to bake a pipe several to several tens of kms long. For this reason, in an experiment on a cable 200 m long, evacuation to vacuum was performed without initial baking.

On the other hand, most of residual gases are turned in known manner into 'water'. At this time, any remaining matter in the vacuum vessel is replaced by nitrogen. Such replacement with nitrogen is normally performed twice or thrice. By so doing, water in the vacuum vessel is absorbed by the nitrogen gas and exhausted to raise the degree of vacuum. After replacement with nitrogen, any remaining matter was evacuated to vacuum by the vacuum pump down to a vacuum pressure of $10^{-1}$ Pa, that is, 0.1 Pa. If the inner pipe is cooled, a vacuum pressure of $10^{-3}$ Pa, that is, 0.001 Pa, should be reached, so that it should be possible to realize a degree of vacuum necessary for vacuum thermal insulation. However, in an experiment conducted in March 2010, the degree of vacuum could hardly be increased, even after cooling, such that a vacuum pressure of a fraction of Pa at most was obtained. This is not the vacuum pressure necessary for vacuum thermal insulation.

We searched into grounds therefor, and arrived at a conclusion that the above mentioned generally accepted common sense may hold valid for a thermally insulated vacuum vessel exploiting liquid helium, and that, if the inner pipe temperature is the liquid nitrogen temperature, the probability is high that a nitrogen gas is left in vacuum at a high pressure. Actually, we analyzed the gas left in vacuum and found that the nitrogen gas was the principal component in vacuum.

We thus arrived at the above mentioned technique. That is, replacement with a gas that solidifies at a liquid nitrogen temperature and that is low in saturation vapor pressure at such temperature, and cooling the inner pipe, are carried out in this order. This causes the gas to solidify and adhere to the inner pipe, thus improving the degree of vacuum. The results of the experiment will now be described as an Example.

<Evacuation to Vacuum for Thermally Insulated Double Pipe (Experimental Data)>

Figure 5A:
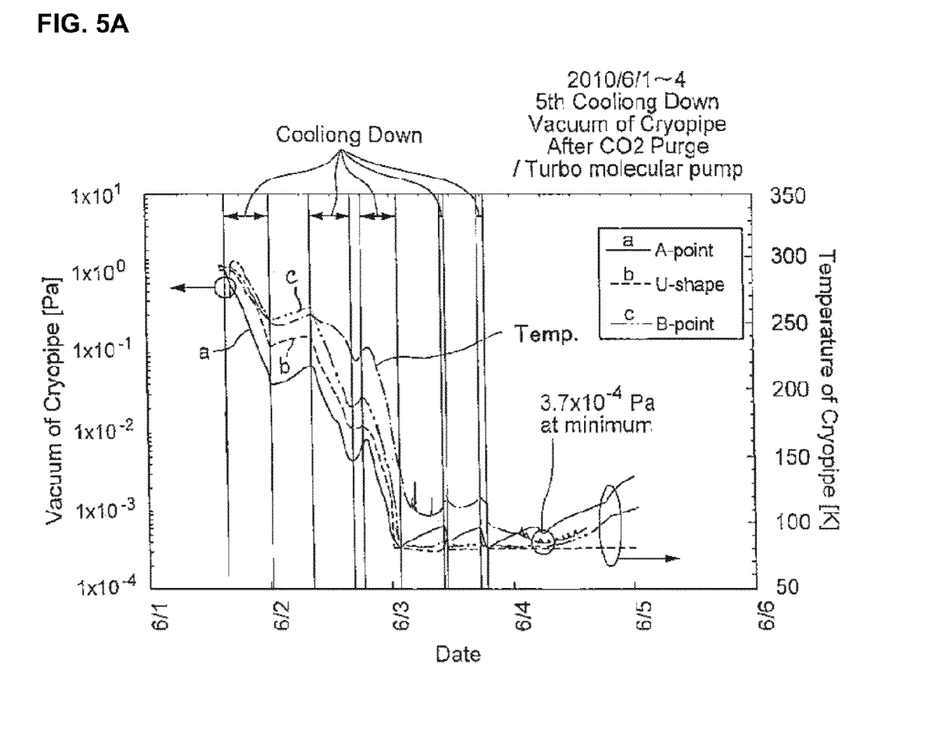
FIG. 5(A) is a graph showing changes over time of the degree of vacuum as from the start of cooling of the inner pipe.
Figure 5B:
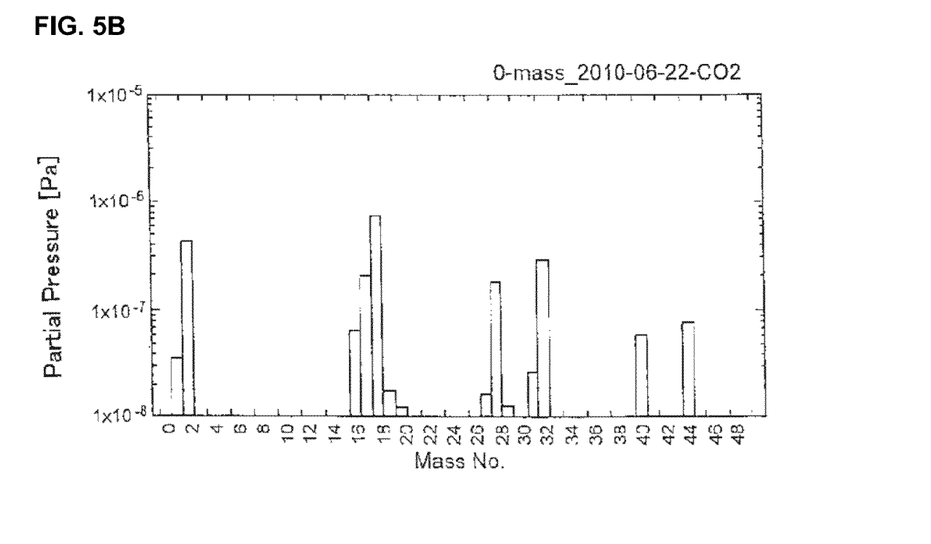
FIG. 5(B) is a graph showing the results of mass analysis of residual gases in vacuum.

FIG. 5(A) depicts a graph showing changes over time of the degree of vacuum at an A-point, a U-shape and at a B-point of the thermally insulated double pipe after replacement by a carbon oxide gas followed by cooling the inner pipe down to the liquid nitrogen temperature. The A-point is a site where liquid nitrogen is introduced, with its vicinity, the U-shape is a turn-around site, and the B-point is a site where liquid nitrogen flows out, with its vicinity. FIG. 5(B) depicts a graph showing results of mass analysis of residual gases in vacuum. The graph of FIG. 5(A) shows changes in the degree of vacuum as found by an experiment conducted as from Jun. 1 until Jun. 5, 2010. The abscissa stands for time and the ordinate stands for the degree of vacuum in Pa. Also, in the figure, a solid line denotes a degree of vacuum at the A-point, a broken line a degree of vacuum at the U-point, a double dotted chain line a degree of vacuum at the B-point and a dotted chain line denotes the temperature. When cooling is commenced (Cooling Down), the degree of vacuum becomes higher until ultimately it reaches $3.7 \times 10^{-4}$ Pa, that is, 0.00037 Pa. This value is higher by one order of magnitude than a value obtained with the conventional method, thus testifying to an extremely high thermal insulation performance of the proposed method.

FIG. 5(B) shows the results of analysis of residual gases after reaching the high degree of vacuum. In the figure, the abscissa denotes the mass number and the ordinate the partial pressure. These values testify to a degree of vacuum which is rather high as compared to the values obtained with the conventional method of replacement with the nitrogen gas.

<Preventing Superconducting Wire Tape Materials from Current Imbalance>

Figure 8:
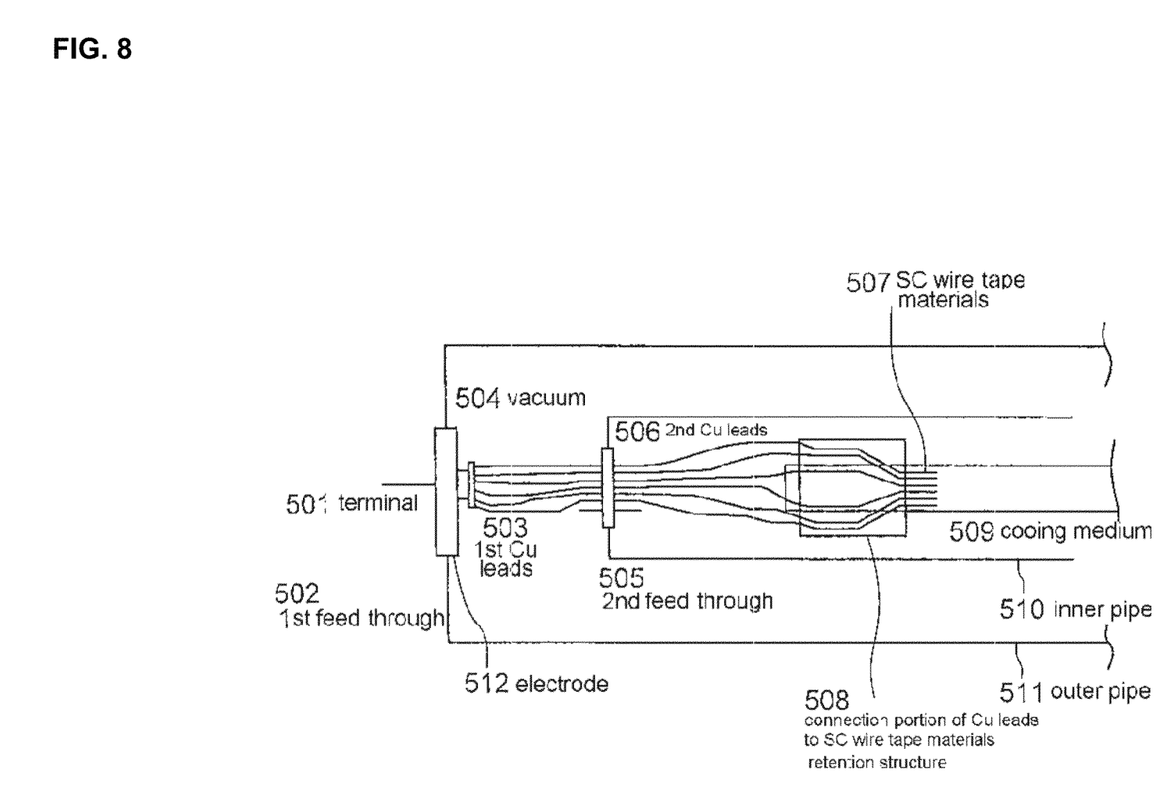
FIG. 8 is a schematic view showing an illustrative exemplary embodiment 5 of the present invention.

FIG. 8 depicts a schematic view showing a configuration of an illustrative exemplary embodiment 5 according to the present invention. A terminal 501, connecting to a copper cable at ambient temperature, is connected to a first feed-through 502 between the atmospheric side and vacuum, with the inside being a vacuum 504. A plurality of first copper leads 503, connected to the first terminal 501, is connected to an electrode 512 on the vacuum side of the first feed-through 502 attached to an outer pipe 511 in which a superconducting cable is housed. Note that respective first leads 503 are electrically insulated from one another. The superconducting cable is disposed within a cooling medium, such as liquid nitrogen, and is composed by a plurality of superconducting wire tape materials 507. Due to its shape, each of the superconducting wire tape materials 507 has only a pre-set bending direction, such that it cannot flexibly adapt itself to a particular site of placement (i.e., routing) in layout. In the subject exemplary embodiment, each of the superconducting wire tape materials 507 is connected to each of a plurality of second copper leads 506. By so doing, any desired target portion of the superconducting wire tape materials may be bent via the second copper leads 506 to effect desired connection. The fact that the copper leads of uniform length and uniform cross-sectional region can be connected in this manner to the respective superconducting wire tape materials 507 is crucial. This structure has been adopted in all experimental devices of the Chubu University.

It is necessary for a connection portion 508 between the second copper leads 506 and the superconducting wire tape materials 507 to provide a stabilized fixing structure. To this end, the connection portion 508 is designed as a retention structure to provide a stabilized strong fixing without exerting stress to a solder connection portion interconnecting the second copper leads 506 and the superconducting wire tape materials 507. Although the retention structure may be of any desired suitable configuration, it may be composed by a first plate having a plurality of grooves or holes in its surface and a second plate placed on top of the first plate. Each of the second copper leads 506 and each of the superconducting linear tape materials 507 are adapted to be guided and moved from opposing lateral sides of the first and second plates into each groove or hole so as to be housed therein. The two plates are then secured together by bolts. It is noted that the surface of the second plate facing the surface of the first plate may also be provided with a plurality of grooves in register with those of the first plate.

The second copper leads 506 are connected to a second feed-through 505 acting as vacuum sealing and electrical insulation. This configuration may assure connection from the power supply cable at the ambient temperature section to the superconducting wire tape materials 507. In such structure, an electrical resistance is partially connected in series with an electric circuit of (any one of) the superconducting wire tape materials 507 by the copper lead(s) connected to the superconducting wire tape material(s) 507. This enables uniform current to flow through an electrical circuit of the superconducting wire tape materials 507. As to this issue, it is possible to avoid that the current flowing through the superconducting wire tape materials is non-uniformly generated due to variations in the connection resistances, in case a long superconducting cable is manufactured or connected in the future. It is noted that, although a plurality of first copper leads 503 are used in FIG. 8, just one first copper lead may also be used. However, in this case, the current may be made uniform solely by the electrical resistances of the second leads.

The disclosures of the aforementioned Patent Publications are incorporated herein by reference thereto. The exemplary embodiments or examples may be modified or adjusted within the scope of the entire disclosure of the present invention, inclusive of claims, based on the fundamental technical concept of the invention. Further, various combinations or selections of the elements disclosed herein may be made within the ambit of the claims. The present invention may encompass various modifications or corrections that may occur to those skilled in the art within the scope of the entire disclosure of the present invention, inclusive of claims and the technical concept of the present invention.

REFERENCE SIGNS LIST 11 cooling medium passage section
12 superconducting conductor section
13 electric insulation section
14 vacuum thermal insulation section
15 inner pipe (first pipe)
16 outer pipe (second pipe)
17 PVC anti-corrosion layer
101 straight-shaped inner pipe section
102 bellows pipe
103 outer pipe
104 inner pipe support section
105 vacuum thermally insulating section
201 superconducting (SC) cable
202 thermally insulated double pipe (double-shell pipe)
203 bellows pipe
210 cryostat
211 terminal support section
212 camera target object
213 illumination device
214 thermal insulation member (partition chamber)
215 window
216 connection member
220 camera
230 control device
240 driving device
301 superconducting cable
302, 303 free supported terminal ends
304 fixed support part to inner pipe
401 inner pipe
402 bellows pipe
403 outer pipe
404 inner pipe support section
405 vacuum thermal insulation section
501 terminal
502 first feed-through
503 first copper leads
504 vacuum
505 second feed-through
506 second copper leads
507 superconducting wire tape materials
508 connection portion
509 cooling medium
510 inner pipe
511 outer pipe
512 electrode

What is claimed is:

1. A superconducting power transmission system, comprising:
a thermally insulated double pipe composed by an inner pipe within which a superconducting cable is installed and by an outer pipe within which the inner pipe is housed; and
an inner pipe support member(s) supporting the inner pipe; the inner pipe support member(s) being secured to the inner and outer pipes, the system further comprising:
an object to be imaged by a camera, with the object being connected to an end part of the superconducting cable within a cryostat;
a camera installed at a site thermally insulated from the cryostat; with the camera being configured for imaging the object within the cryostat through a window;
a control device that analyzes picture image data of the object acquired by the camera to detect displacement thereof; and
a driving device that, on detection of the displacement of the object by the control device, causes movement of the cryostat in its entirety.

2. The superconducting power transmission system according to claim 1, further comprising:
an illumination device that illuminates the object.

3. The superconducting power transmission system according to claim 1, further comprising
a bellows pipe(s) connected to the outer pipe.

4. The superconducting power transmission system according to claim 1, wherein,
the object is arranged at an end part of a straight-shaped connection member; with the straight-shaped connection member being connected to a support section at an end part of the superconducting cable and being further extended along a length of the cable.

5. The superconducting power transmission system according to claim 1, wherein,
both ends of the superconducting cable are provided with free supported terminal ends movable along the length of the cable.

6. The superconducting power transmission system according to claim 5, wherein,
the superconducting cable is fixedly supported by the inner pipe at a mid part between both ends of the superconducting cable.

7. The superconducting power transmission system according to claim 1, wherein,
a pre-set sort of gas is introduced into a vacuum thermally insulating section between the inner and outer pipes of the thermally insulated double pipe to effect gas replacement to perform evacuation to vacuum.

8. The superconducting power transmission system according to claim 7,
wherein, the inner pipe is cooled following the evacuation to vacuum.

9. A superconducting power transmission system comprising: a thermally insulated double pipe composed by an inner pipe within which a superconducting cable is installed and by an outer pipe within which the inner pipe is housed; and an inner pipe support member(s) supporting the inner pipe; the inner pipe support member(s) being secured to the inner and outer pipes, wherein, a pre-set sort of gas is introduced into a vacuum thermally insulating section between the inner and outer pipes of the thermally insulated double pipe to effect gas replacement to perform evacuation to vacuum, wherein, the preset sort of gas comprises a carbon oxide gas.

10. The superconducting power transmission system according to claim 7, wherein,
the pre-set sort of gas is such a gas that solidifies at a temperature higher than a liquid nitrogen temperature, having a low saturated vapor pressure upon solidification, that is gaseous at ambient temperature and ambient pressure, that is relatively low in viscosity and in dipolar moment, and that has a relatively high mass number.

11. The superconducting power transmission system according to claim 7, wherein,
the pre-set sort of gas is:
a rare gas comprising argon and xenon, excerpt for neon,
a chlorofluorocarbon (CFC) gas,
a hydrocarbon-based gas, or
a mixture(s) thereof.

12. The superconducting power transmission system according to claim 1, wherein,
the superconducting cable includes a plurality of superconducting wire tape materials;
the outer pipe includes a first feed-through;
the inner pipe includes a second feed-through facing the first feed-through;
one or a plurality of first leads being electrically insulated one from another; one end(s) of the first lead(s) being connected to a vacuum side electrode of the first feed-through and the other end(s) of the first lead(s) being connected to one side of the facing second feed-through;
a plurality of second leads electrically insulated one from another, the second leads having one ends connected to the first lead(s) at an opposite side of the second feed-through and having the other opposite ends connected to one ends of the plurality of the superconducting wire tape materials;
a connection portion between the plurality of the second leads and the plurality of the superconducting wire tape materials formed of a retention structure.

* * * * *